Patented Mar. 9, 1937

2,072,901

UNITED STATES PATENT OFFICE 2,072,901

MANUFACTURE OF SYNTHETIC RESINS

William Henry Moss, London, England, assignor to Celanese Corporation of America, a corporation of Delaware No Drawing. Application November 10, 1934, Serial No. 752,473. In Great Britain November 22, 1933

18 Claims. (Cl. 260—4)

This invention relates to new synthetic resins and in particular to the manufacture of new phenolic resins and compositions of matter containing the same.

According to the present invention new synthetic resins are produced by reacting a phenol with a halogenated aliphatic ketone, and then reacting the product with formaldehyde or a substance yielding formaldehyde. The invention includes not only the manufacture of the synthetic resins and the synthetic resins themselves, but also lacquers, moulding powders, plastic materials and other compositions or articles containing them.

The phenols employed according to the present invention are preferably monohydric phenols, e. g. xylenols and meta- and para-cresols, and poly-nuclear compounds which, though more than one phenolic group is present, do not contain more than one such group in each nucleus. Particularly valuable phenols are phenol itself, o-cresol, the mixture of cresols known as cresylic acid, and diphenylol propane. The best halogenated ketone to employ is chloracetone, though other halogenated ketones, e. g. monochlor methyl ethyl ketone may be employed. Instead of formaldehyde itself, substances yielding formaldehyde, e. g. hexamethylene tetramine may be used, and the term "formaldehyde" is used in the description and claims to include such substances.

The formation of the resin is preferably carried out in the presence of a suitable catalyst, e. g. hydrochloric acid, phosphoric acid, zinc chloride or other acid catalyst, or caustic soda or other alkaline catalyst. The resin may be obtained by reacting the phenol with the ketone and then reacting the product with formaldehyde, or, alternatively, instead of forming the resin direct from the phenol, ketone and aldehyde in a continuous process, the previously prepared product obtained from a phenol and a ketone may be reacted with formaldehyde to form a resin of the type to which the present invention relates. Thus condensation products obtained from a phenol and chloracetone are already known, and the resins of the present invention may be obtained by reacting such products with formaldehyde. The proportions of constituents employed may be varied, but in general proportions of about two molecules of the phenol to one molecule of ketone and from one to three molecules of formaldehyde yield the best results. When an acid catalyst is to be employed in a reaction in which hexamethylene tetramine is present, due allowance should of course be made for the acid neutralized in decomposing the hexamethylene tetramine.

By the process of the present invention fusible resins may be obtained which are soluble in solvents such as acetone, alcohol, acetic acid and dilute caustic soda, and which in general are insoluble in benzene and similar hydrocarbons. On heating they may be converted into an infusible insoluble form and for this reason they are very suitable for use in the production of moulded products, e. g. gramophone records. They have a very good resistance to light, and films containing them in conjunction with cellulose acetate may be obtained which show practically no darkening after an exposure of four days to the fadeometer, (whereas ordinary phenol-formaldehyde resins show considerable darkening under these conditions) which is of course a property of great value when they are employed in lacquers. They are in general compatible with cellulose acetate and other cellulose derivatives, particularly when prepared in the presence of acid catalysts, and also with other natural and synthetic resins, particularly with the synthetic resins obtained by the polymerization of vinyl acetate or other vinyl compounds. As stated above, the resins obtained from chloracetone, formaldehyde and phenol, o-cresol, cresylic acid or diphenylol propane are especially valuable, since they possess the above properties to a marked degree.

Compositions containing the synthetic resins of the present invention may contain suitable plasticizers, examples of which are tricresyl and triphenyl phosphates and other alkyl phosphates, di-ethyl and di-butyl tartrates and other esters, for example di- and tri-acetins. They may also contain colouring materials, e. g. boneblack, iron oxide and manganese dioxide, and fillers, for example china clay, micro asbestos, bentonite, wood flour, cotton flock, mica and gypsum.

The following examples are given in order to illustrate the invention, but it is to be understood that they do not limit it in any way:—

Example 1

The following is an example of one method of preparing a synthetic resin according to the present invention. 50 parts by weight of phenol-chloracetone resin are heated at 100° C. under reflux for about 5 minutes with 20–40 parts by weight of 40% formaldehyde solution in the presence of about .5 parts by weight of concentrated hydrochloric acid. The resin formed is washed with water and is similar in appearance to the phenol-chloracetone resin except that it has a lower melting point. When washed and dried it is fusible at about 100° C., while on cooling it shows a solidifying point of approximately 80° C., whereas the phenol-chloracetone resin employed as starting material solidifies at about 120° C. Moreover, while the phenol-chloracetone resin may be heated for a considerable time at temperatures up to 200° C. without being converted into an insoluble form, the phenol-chloracetone formaldehyde resin may be converted into such form by heating at temperatures of even of the order of 100° C. This property of course is of great importance in the manufacture of moulded products. The resin is soluble in acetone, acetic acid, and dilute caustic soda, and insoluble in benzole, and is compatible with cellulose acetate in all proportions giving hard films.

The process described in the above example may be modified by the use of about .25 parts by weight of phosphoric acid instead of the hydrochloric acid. In this case the reaction is considerably slower, taking from 2–4 hours, and in consequence may be better controlled. If, instead of phosphoric acid an alkaline catalyst is used, for example 2 parts by weight of 5% caustic soda solution, the resin obtained is incompatible with cellulose acetate.

Example 2

108 parts by weight of ortho-cresol are heated under reflux with 46 parts by weight of chloracetone in the presence of 10 parts by weight of concentrated hydrochloric acid. A vigorous reaction takes place which is controlled by cooling if necessary. The resinous condensation product obtained, which when purified melts at about 110° C., is then reacted with formaldehyde in a proportion of about 55 parts of resin to 20 to 40 parts of 40% formaldehyde. The reaction may be effected by similar methods to those described in the preceding example, and a resin which has similar properties to that produced according to Example 1 is obtained.

The following are examples of compositions containing the resin of the present invention:—

Example 3

A clear coating lacquer may be prepared from the following constituents:—

| | Parts by weight |
|---|---|
| Cellulose acetate | 40 |
| Phenol-chloracetone formaldehyde resin | 60 |
| Diethyl phthalate | 20 |
| Tricresyl phosphate | 5 |
| Acetone | 200 |
| Benzene | 112 |
| Alcohol | 88 |
| Ethyl lactate | 40 |

Example 4

A pigmented lacquer may be obtained by incorporating 20 parts by weight of chrome green or 10 parts by weight of carbon black in the lacquer described in Example 3.

Example 5

A composition containing vinyl acetate and the synthetic resin may be obtained from the following constituents:—

| | Parts by weight |
|---|---|
| Polymerized vinyl acetate | 50 |
| Phenol-chloracetone formaldehyde resin | 50 |
| Acetone | 200 |
| Benzene | 112 |
| Alcohol | 88 |

Instead of vinyl acetate, ethyl cellulose, benzyl cellulose or cellulose nitrate may be employed.

Example 6

A plastic composition containing the resin may be obtained as follows:—

| | Parts by weight |
|---|---|
| Cellulose acetate | 100 |
| Phenol-chloracetone formaldehyde resin | 25 |
| Dibutyl tartrate | 30 |

The dibutyl tartrate and resin are incorporated in any suitable manner with the cellulose acetate, either with or without the use of solvents. The resulting mass may be ground to a fine powder, suitable for moulding.

The above composition may also contain a filler, e. g. china clay, micro asbestos or bentonite.

Example 7

A product containing a large amount of resin is prepared from the following constituents:—

| | Parts by weight |
|---|---|
| Phenol-chcloracetone formaldehyde resin | 95 |
| Cellulose acetate | 14 |
| Triacetin | 45 |
| China clay | 120 |

Instead of the phenol-chloracetone formaldehyde resin the resin obtained from ortho-cresol according to Example 2 may be employed in corresponding proportions in Examples 3–7.

As will be seen from the above description and examples the properties of the new synthetic resins render them very valuable for commercial purposes. Thus on account of their high stability to light and their compatibility with cellulose acetate and other cellulose derivatives and with other resins they are very valuable for lacquers and other coating compositions, while their property of being rapidly converted into an insoluble infusible form renders them of considerable importance for the production of moulded products. Further their solubility in organic solvents such as acetone renders them very suitable for use in the manufacture of films and other products by wet or dry spinning processes.

What I claim and desire to secure by Letters Patent is:—

1. The manufacture of synthetic resins, comprising reacting formaldehyde with the condensation product of a phenol with a halogenated aliphatic ketone.

2. The manufacture of synthetic resins, comprising reacting formaldehyde with the condensation product of a phenol with chloracetone.

3. The manufacture of synthetic resins, comprising reacting formaldehyde in the presence of an acid catalyst with the condensation product of a phenol with chloracetone.

4. The manufacture of synthetic resins, comprising reacting formaldehyde in the presence of an acid catalyst with the condensation product of phenol itself with chloracetone.

5. The manufacture of synthetic resins, comprising reacting formaldehyde in the presence of an acid catalyst with the condensation product of ortho-cresol with chloracetone.

6. The manufacture of synthetic resins, comprising reacting formaldehyde in the presence of an acid catalyst with the condensation product of diphenylol propane with chloracetone.

7. The manufacture of synthetic resins, comprising reacting 1 to 3 molecular proportions of formaldehyde with the condensation product obtained by reacting about 2 molecular proportions of a phenol with about 1 molecular proportion of a halogenated aliphatic ketone.

8. The manufacture of synthetic resins, comprising reacting 1 to 3 molecular proportions of formaldehyde with the condensation product obtained by reacting about 2 molecular proportions of a phenol with about 1 molecular proportion of chloracetone.

9. A synthetic resin obtainable by reacting formaldehyde with the condensation product of a phenol with a halogenated aliphatic ketone.

10. A synthetic resin obtainable by reacting formaldehyde with the condensation product of a phenol with chloracetone.

11. A synthetic resin obtainable by reacting formaldehyde with the condensation product of phenol itself with chloracetone.

12. A synthetic resin obtainable by reacting formaldehyde with the condensation product of ortho-cresol with chloracetone.

13. A synthetic resin obtainable by reacting formaldehyde with the condensation product of diphenylol propane with chloracetone.

14. Compositions of matter containing a synthetic resin obtainable by the reaction of formaldehyde with the condensation product of a phenol with a halogenated aliphatic ketone.

15. Compositions of matter containing a synthetic resin obtainable by the reaction of formaldehyde with the condensation product of a phenol with a halogenated aliphatic ketone in the presence of an acid catalyst.

16. Compositions of matter containing a synthetic resin obtainable by the reaction of formaldehyde with the condensation product of a phenol with chloracetone.

17. Compositions of matter containing a synthetic resin obtainable by the reaction of formaldehyde with the condensation product of chloracetone with a phenol selected from the group consisting of phenol, ortho-cresol, cresylic acid and diphenylol-propane.

18. Gramophone records and other molded products comprising a synthetic resin obtainable by the reaction of formaldehyde with the condensation product of a phenol with a halogenated aliphatic ketone.

WILLIAM HENRY MOSS.